(12) United States Patent
Stang (10) Patent No.: US 9,790,831 B2
(45) Date of Patent: Oct. 17, 2017

(54) VALVE SOLENOID WITH IMPROVED PERFORMANCE

(71) Applicant: Cummins Emission Solutions, Inc., Columbus, IN (US)

(72) Inventor: Jakob Stang, Marktheidenfeld (DE)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 16 days.

(21) Appl. No.: 15/087,285

(22) Filed: Mar. 31, 2016

(65) Prior Publication Data

US 2016/0290200 A1 Oct. 6, 2016

Related U.S. Application Data

(60) Provisional application No. 62/141,604, filed on Apr. 1, 2015.

(30) Foreign Application Priority Data

May 26, 2015 (DE) .......................... 10 2015 006 517

(51) Int. Cl.
*F01N 3/20* (2006.01)
*H01F 7/16* (2006.01)

(52) U.S. Cl.
CPC ........... *F01N 3/208* (2013.01); *F01N 3/2066* (2013.01); *H01F 7/1607* (2013.01); *F01N 2610/02* (2013.01); *F01N 2610/146* (2013.01); *F01N 2610/1433* (2013.01); *F01N 2610/1453* (2013.01)

(58) Field of Classification Search
CPC .... F01N 3/2066; F01N 3/208; F01N 2610/02; F01N 2610/1433; F01N 2610/1453; F01N 2610/146
USPC .......................................... 60/324
See application file for complete search history.

(56) References Cited

U.S. PATENT DOCUMENTS

| 3,326,511 | A | 6/1967 | Hallgreen |
| 3,432,140 | A | 3/1969 | Ray |
| 5,960,776 | A | 10/1999 | Everingham et al. |
| 7,383,819 | B1* | 6/2008 | Ogawa ................ F02M 57/023 123/476 |
| 7,980,483 | B2 | 7/2011 | Stretch |
| 8,024,922 | B2 | 9/2011 | Van Vuuren et al. |

(Continued)

*Primary Examiner* — Mark Laurenzi
*Assistant Examiner* — Dapinder Singh
(74) *Attorney, Agent, or Firm* — Foley & Lardner LLP (57) ABSTRACT

A valve solenoid includes a coil pot having an internal volume. A coil is positioned concentrically within the internal volume. An outer tube is positioned concentrically within the coil. A pole core is positioned concentrically within the outer tube. An armature includes an armature first portion positioned distal from the pole core and an armature second portion at least a portion of which is positioned concentrically within the outer tube. An inner tube is positioned concentrically within the channel defined by the armature such that the at least a portion of the armature second portion is positioned concentrically between the outer tube and the inner tube. An armature pin is fixedly coupled to the armature. A biasing member is positioned within the channel. A first end of the biasing member is coupled to the armature pin and a second end of the biasing member coupled to the pole core.

21 Claims, 3 Drawing Sheets

(56) References Cited

U.S. PATENT DOCUMENTS

| | | | |
|---|---|---|---|
| 8,087,239 B2 | 1/2012 | Bugos et al. | |
| 8,225,602 B2 | 7/2012 | Cavanagh et al. | |
| 8,528,322 B2 | 9/2013 | Van Vuuren | |
| 8,584,707 B2 * | 11/2013 | Ambrose | F16K 27/003 |
| | | | 137/550 |
| 8,613,603 B2 | 12/2013 | Cooke | |
| 8,701,389 B2 | 4/2014 | Thomas et al. | |
| 8,870,091 B2 | 10/2014 | McKaig et al. | |
| 2001/0033214 A1 * | 10/2001 | Bircann | F16K 31/0655 |
| | | | 335/220 |
| 2009/0114864 A1 | 5/2009 | Scheffer | |
| 2014/0137543 A1 | 5/2014 | Van Vuuren et al. | |

* cited by examiner

VALVE SOLENOID WITH IMPROVED PERFORMANCE

CROSS REFERENCE TO RELATED APPLICATIONS

The present application claims priority to German Patent Application No. 102015006517.3, filed on May 26, 2015, which claims the benefit of priority to U.S. Provisional Patent Application No. 62/141,604, filed on Apr. 1, 2015. The contents of these applications are incorporated herein by reference in their entirety.

TECHNICAL FIELD

The present disclosure relates generally to solenoids which can be used for actuating valves.

BACKGROUND

Solenoids use the principal of electromagnetism to produce an electric field for moving an armature of the solenoid in an axial direction. When an electric current is passed through a wounded coil included in the solenoid, an electromagnetic field is produced within the coil. This electromagnetic current is used to axially displace an armature included in the solenoid proximal or distal relative to the coil. Due to their relatively simple operation, solenoids are widely used as actuators for operating valves.

In conventional solenoids, the armature is generally positioned outside of a body of the solenoid coil housing. An armature pin can be coupled to the armature which guides the movement of the armature pin relative to the coil. The axial displacement of the armature towards the coil is generally opposed by a biasing member included in the solenoid configured to urge the armature pin and armature axially distal relative to the coil towards a valve. The electromagnetic field produced by the coil includes axial as well as radial components. While the axial component of the electromagnetic field pulls the armature towards the coil, the radial components tend to twist the armature about an axial axis of the solenoid. The axial movement can misalign the armature increasing friction and possibly causing the armature to be stuck thereby, resulting in the solenoid malfunctioning. To prevent the radial movement of the armature, conventional solenoids include centering shims and chamfered armature pins to prevent axial movement. This complicates the design and manufacturing (and therefore the cost) of the solenoid.

SUMMARY

Embodiments described herein relate generally to valve solenoids and in particular to a valve solenoid that includes a portion of the armature disposed between an outer tube and an inner tube of the solenoid which guide an axial movement of the coil during an operation of the solenoid to inhibit or prevent radial movement of the armature.

In some embodiments, a valve solenoid comprises a coil pot defining an internal volume. A coil is positioned concentrically within the internal volume and spaced apart from the coil pot. An outer tube is positioned concentrically within the coil. A pole core is positioned concentrically within the outer tube. The pole core includes a pole core first portion, a pole core second portion and a pole core third portion. The pole core first portion is positioned concentrically within the outer tube and the pole core second portion is positioned outside the outer tube. The valve solenoid also includes an armature which includes an armature first portion and an armature second portion. The armature first portion is positioned distal from the pole core and outside the coil pot. The armature second portion extends from the armature first portion towards the pole core such that at least a portion of the armature second portion is positioned concentrically within the outer tube. The armature defines a channel therewithin.

At least a portion of an inner tube is positioned concentrically within the channel defined by the armature such that the at least a portion of the armature second portion is positioned concentrically between the outer tube and the inner tube. An armature pin is fixedly coupled to the armature proximal to the armature first portion. At least a portion of the armature pin is positioned within the channel. A biasing member is positioned within the channel. A first end of the biasing member is coupled to the armature pin and a second end of the biasing member is coupled to the pole core. The biasing member is configured to exert a biasing force on the armature pin in a direction distal from the pole core.

In particular embodiments, the valve solenoid is movable between a first configuration or first operating mode and a second configuration or a second operating mode. In the first operating mode no electromagnetic field is produced by the coil. The biasing member exerts an axial force on the armature pin such that the armature is positioned distal from the pole core and a gap exists between the pole core first portion and the armature second portion. In the second operating mode, an electromagnetic field is produced by the coil. The electromagnetic field pulls the armature in an axial direction towards the pole core against the biasing force. The armature second portion axially slides between the outer tube and the inner tube towards the pole core and contacts the pole core first portion.

In another embodiment, a system comprises an exhaust reductant storage tank and a pumping assembly. The pumping assembly includes a valve and a valve solenoid coupled to the valve. The valve solenoid includes a coil pot defining an internal volume. A coil is positioned concentrically within the internal volume and spaced apart from the coil pot. An outer tube is positioned concentrically within the coil. The valve solenoid includes a pole core which includes a pole core first portion, a pole core second portion and a pole core third portion. The pole core first portion is positioned concentrically within the outer tube and the pole core second portion is positioned outside the outer tube. An armature includes an armature first portion and an armature second portion. The armature first portion is positioned distal from the pole core and outside the coil pot. The armature second portion extends from the armature first portion towards the pole core. At least a portion of the armature second portion is positioned concentrically within the outer tube. The armature defines a channel therewithin.

At least a portion of an inner tube is positioned concentrically within the channel defined by the armature such that the at least a portion of the armature second portion is positioned concentrically between the outer tube and the inner tube. An armature pin is fixedly coupled to the armature proximal to the armature first portion. At least a portion of the armature pin is positioned within the channel. An end of the armature pin distal from the armature is coupled to the valve. A biasing member is positioned within the channel. A first end of the biasing member is coupled to the armature pin and a second end of the biasing member is coupled to the pole core. The biasing member is configured to exert a biasing force on the armature pin in a direction distal from the pole core. A selective catalytic reduction (SCR) system is in fluidic communication with the pumping assembly via the valve. The SCR system includes at least one catalyst formulated to treat an exhaust gas flowing through the SCR system in the presence of the exhaust reductant.

In still another embodiment, a method of operating a valve using a valve solenoid as described above comprises passing an electric current through the coil. The electric current produces an electromagnetic field within the coil. The electromagnetic field conducts through the armature and the pole core and causes the armature to move in an axial direction towards the pole core. The armature second portion slides axially between the outer tube and the inner tube towards the pole core and contacts the pole core first portion so as to axially move the armature pin distal from the valve. The distal movement of the armature pin opens the valve. The electric current is stopped to the coil to remove the electromagnetic field. The removing allows the biasing member to exert a biasing force on the armature pin. The biasing force causes the armature to axially displace distal from the pole core. The armature second portion slides axially between the outer tube and the inner tube away from the pole core so that a gap exists between the pole core first portion and the armature second portion. The displacement of the armature causes the armature pin to move axially towards the valve and close the valve.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different operating modes, all of which are explicitly contemplated and made part of this disclosure.

DETAILED DESCRIPTION OF VARIOUS EMBODIMENTS

Embodiments described herein relate generally to valve solenoids and in particular to a valve solenoid that includes a portion of the armature disposed between an outer tube and an inner tube of the solenoid which guide an axial movement of the coil during an operation of the solenoid to inhibit or prevent radial movement of the armature.

Various embodiments of the valve solenoid described herein may provide several benefits including, for example: (1) positioning a portion of an armature of the valve solenoid between an outer tube and an inner tube of the valve solenoid for guiding axial displacement of the armature within the solenoid; (2) inhibiting or preventing radial movement of the armature during the axial displacement to reduce friction and prevent failure of the valve solenoid; (3) simplifying manufacturing of the valve solenoid by obviating the inclusion of the centering shims which are used in conventional solenoids to prevent radial movement, thereby reducing cost; and (4) providing a homogenous magnetic field which leads to homogenous pull on armature, lesser radial force and increase in the electromagnetic force.

Figure 1:
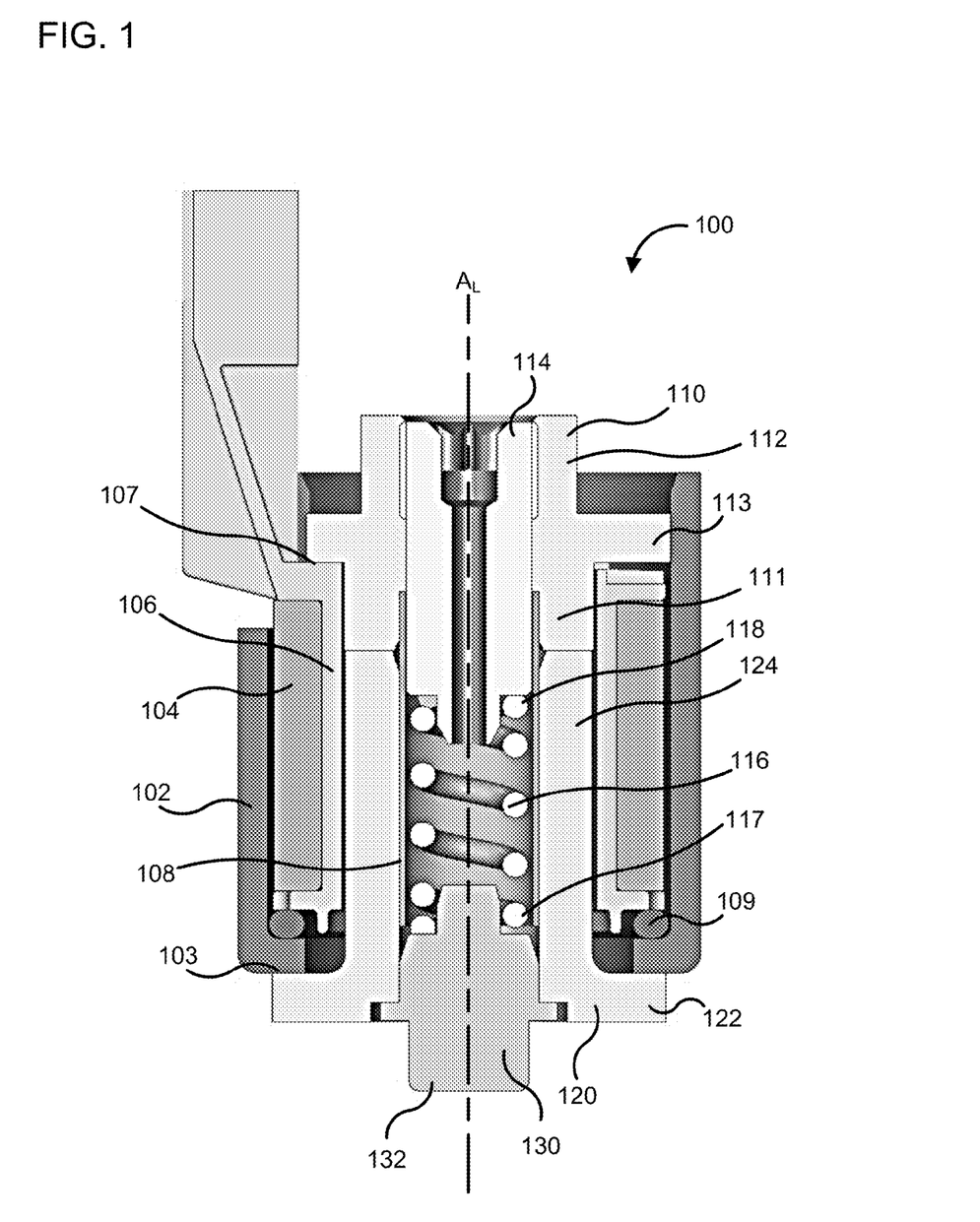
FIG. 1 is a side cross-section of a valve solenoid, according to an embodiment.

FIG. 1 is a side cross-section of a valve solenoid 100, according to an embodiment. The valve solenoid 110 includes a coil pot 102, a coil 104, an outer tube 106, a pole core 110, an armature 120, and inner tube 108, an armature pin 130, a biasing member 116 and optionally, an adjustment member 114. The valve solenoid 100 can be used to actuate a valve, for example, a diaphragm valve or any other valve.

The coil pot 102 defines an internal volume within which the components of the valve solenoid 100 are disposed. The coil pot 102 can include a metallic housing (e.g., an aluminum or stainless steel housing). In one embodiment, the coil pot 102 has a circular cross-section. In other embodiments, the coil pot 102 can have other suitable cross-sections, for example, square, rectangular, polygonal, etc.

The coil 104 is positioned concentrically within the internal volume defined by the coil pot 102. The coil 104 is positioned adjacent to but spaced apart from the coil pot 102. In one embodiment, a spacer can be positioned between the coil 104 and the coil pot 102 to maintain the coil 104 spaced apart from the coil pot 102. The spacer can be formed from an insulating material (e.g., foam) to electrically insulate the coil 104 from the coil pot 102. The coil 104 can include a helically wounded coil formed from an electrically conducting material (e.g., copper wire, stainless steel, etc.). The coil 104 is configured to electrically couple to a source of electricity for producing an electromagnetic field, as described herein.

The outer tube 106 is positioned concentrically within the coil 104. In particular embodiments, the coil 104 can be wound on an outer surface of the outer tube 106. The outer tube 106 can be formed from an electrically insulating material (e.g., plastics). A compliance member 109, for example an O-ring, is positioned within the internal volume of the coil pot 104. The compliance member 109 is configured to position the outer tube 106 and thereby the coil 104 at predetermined depth within the internal volume of the coil pot 102, once the solenoid 100 is assembled.

The pole core 110 includes a pole core first portion 111, a pole core second portion 112, and a pole core third portion 113. The pole core 110 can be formed from a strong and rigid material, for example stainless steel. The pole core first portion 111 extends towards the coil 104 parallel to a longitudinal axis $A_L$ of the solenoid 100 and is positioned within the outer tube 106, as shown in FIG. 1. The pole core second portion 112 extends axially in an opposite direction relative to the pole core first portion 111 and is positioned outside the outer tube 106. At least a portion of the pole core second portion 112 can extend beyond and be positioned outside the internal volume of the coil pot 102.

The pole core third portion 113 is positioned about midway between the pole core first portion 111 and the pole core second portion 112, and extends perpendicular to the longitudinal axis $A_L$ towards the coil pot 102. At least a portion of the pole core third portion can be positioned adjacent to an inner surface of the coil pot 104 and abuts the coil pot 102. The pole core 110 is fixedly coupled to the inner surface of the coil pot 102, for example, via welding (e.g., arc welding, fusion welding, etc.). A second portion of the pole core third portion 113 can overlap with a sidewall 107 of the outer tube 106 positioned orthogonal to the longitudinal axis $A_L$ and fixedly coupled to the outer tube 106 at the sidewall 107 (e.g., via welding). In this manner, the pole core 110 in combination with the compliance member 109 can fixedly position the outer tube 106 and thereby the coil 104 at a predetermined depth within the inner volume of the coil pot 102.

The armature 120 includes an armature first portion 122 and an armature second portion 124. The armature 120 can be formed from any suitable material, for example stainless steel. The armature first portion 122 is positioned distal from the pole core 110 and outside the coil pot 102. The armature first portion 122 extends perpendicular to the longitudinal axis $A_L$ towards the coil pot 102 such that at least portion of the armature first portion 122 is adjacent and overlaps an end surface 103 of the coil pot 102. The armature first portion 122 and the end surface 103 of the coil pot 102 can serve to limit motion of the armature 120 towards the pole core 110, as described herein. In other embodiments, the armature second portion 124 and the pole core first portion 111 serve to limit the motion of the armature 120 towards the pole core 110.

The armature second portion 124 extends orthogonally from the armature first portion 122 towards the pole core 110. At least a portion of the armature second portion 124 is positioned concentrically within the outer tube 106. The armature 120 defines a channel therewithin. At least a portion of the inner tube 108 is positioned concentrically within the channel defined by the armature 120 such that at least a portion of the armature second portion 124 is positioned concentrically between the outer tube 106 and the inner tube 108. The armature second portion 124 can slide axially between the outer tube 106 and the inner tube 108. A combination of the outer tube 106 and the inner tube 108 inhibit or prevent radial movement of the armature 120 during axial movement of the armature 120.

The armature pin 130 is fixedly coupled (e.g., welded) to the armature 120 proximal to the armature first portion 122. The armature pin 130 can be formed from any suitable material, for example stainless steel. In particular embodiments, the armature pin 130 can be formed monolithically with the armature 120. At least a portion of the armature pin 130 is positioned within the channel defined by the armature 120. A distal end 132 of the armature pin 130 is extends axially distal from the armature 120. The distal end 132 of the armature pin 130 can be in contact with a valve (not shown) and actuate the valve due to an axial movement of the armature 120 and the thereby the armature pin 130, as described herein.

The biasing member 116 is positioned within the channel defined by the armature 120. The biasing member 116 can include a spring (e.g., a helical spring). A first end 117 of the biasing member 116 is coupled to the armature pin 130 and a second end 118 of the biasing member 116 is coupled to the adjustment member 114 positioned within the pole core 110. In particular embodiments in which the adjustment member 114 is not included, the second end 118 of the biasing member 116 can be coupled directly to the pole core 110. The biasing member 116 is configured to exert a biasing force on the armature pin 130 and thereby, the armature 120 in an axial direction away from the pole core 110.

The biasing member 116 thus serves to movably couple the armature pin 130 and thereby, the armature 120 to the pole core 110. This enables the armature 120 to move axially relative to the pole core 110 under the influence of an electromagnetic field produced by the coil 104. The movement of the armature 120 and the armature pin 130 is guided by the outer tube 106 and the inner tube 104 as the armature second portion 124 slides between the outer tube 106 and the inner tube 108.

As shown in FIG. 1, the adjustment member 114 is positioned within the pole core 110 and the second end 118 of biasing member 116 is coupled to the adjustment member 114. The adjustment member 114 can include, for example, a screw such as a lead screw. At least a portion of the adjustment member 114 is positioned within the inner tube 108. The adjustment member 114 can be coupled to the pole core 110 via threads defined on an inner surface of the pole core 110. In this manner, the adjustment member 114 serves as a lead screw which can be axially displaced within the pole core 110 via a rotation of the adjustment member 114. The rotation of the adjustment member 114 is configured to adjust a length of the portion of the adjustment member 114 positioned within the inner tube 108. In alternate embodiments, the adjustment member 114 can be positioned within the armature 120. For example, the adjustment member 114 can be positioned proximal to the armature first portion 122 in place of the armature pin 130. In such embodiments the armature pin 130 can be positioned within the pole core 110. In other words, the position of the armature pin 130 and the adjustment member 114 can be switched.

The axial movement of the adjustment member 114 proximally or distally relative to the pole core 110 also moves the armature pin 130, and thereby the armature, axially relative to the pole core 110 and the coil pot 102. Since the axial motion of the armature pin 130 and the armature 120 towards the pole core 110 is limited by the armature first portion 122 and the end surface 103 of the coil pot 102 or the pole core first portion 111, the more the adjustment member 114 is axially moved into the inner tube 108, the further the armature 120 is pushed out of the coil pot 102. This increases the travel distance of the armature 120 towards the pole core 110 under the influence of the electromagnetic field. The travel distance of the armature 120 towards pole core 110 directly corresponds to the amount of compression experienced by the biasing member 116 and thereby, the force exerted by the biasing member 116 on the armature pin 130. In this manner, the adjustment member 114 can be used to adjust a biasing force of the biasing member 116 on the armature pin 130.

In operation, the valve solenoid 100 can be moved between a first operating mode and a second operating mode. In the first operating mode, no current is provided to the coil 104 such that no electromagnetic field is produced by the coil 104. The biasing member 116 exerts an axial force on the armature pin 130 such that the armature 120 is positioned distal from the pole core 110. A gap exists between the pole core first portion 111 and the armature second portion 124. The armature pin 130 can be coupled to or otherwise be in contact with a valve (e.g., a diaphragm valve). The biasing member 116 pushes the armature pin 130 towards the valve to close the valve.

In the second operating mode, a current is provided to the coil 104 such that an electromagnetic field is produced by the coil 104. The electromagnetic field pulls the armature 120 in an axial direction towards the pole 110 against the biasing force of the biasing member 116. The armature second portion 124 slides between the outer tube 106 and the inner tube 108 axially towards the pole core 110 until the armature second portion 124 contacts the pole core first portion 111. The pole core first portion 124 therefore serves to prevent any further movement of the armature 120 towards the pole core 110. In another embodiment, the armature 120 moves towards the pole core 110 under the influence of the electromagnetic field until the armature first portion 122 contacts the end surface 103 of the coil pot 102. If the armature pin 130 is in contact with or coupled to a valve, the armature pin 130 axially moves distally relative to the valve to release the force on the valve allowing the valve to open.

The axial movement of the armature 120 towards or away from the pole core 110 is guided by the armature second portion 124 sliding between the outer tube 106 and the inner tube 108. A space between the outer tube 106 and the inner tube 108 is sufficient for the armature second portion 124 to slide therewithin. However, the combination of the outer tube 106 and the inner tube 108 prevent radial movement of the armature 120 during the axial displacement of the armature 120 relative to the pole core 110. This reduces friction during movement of the armature 120, thus reducing malfunction of the valve solenoid due to the armature 120 getting stuck as a result of radial movement.

The valve solenoid 100 can be used in any suitable system for operating a valve included in a system. For example, the valve solenoid 100 can be included in pumping assemblies, fluid supply lines, or generally used to actuate valves in any fluidic system. In particular embodiments, the valve solenoid 100 can be used for actuating a valve included in a pumping assembly configured to communicate an exhaust reductant into a selective catalytic reduction (SCR) system which is included in an aftertreatment system.

Figure 2:
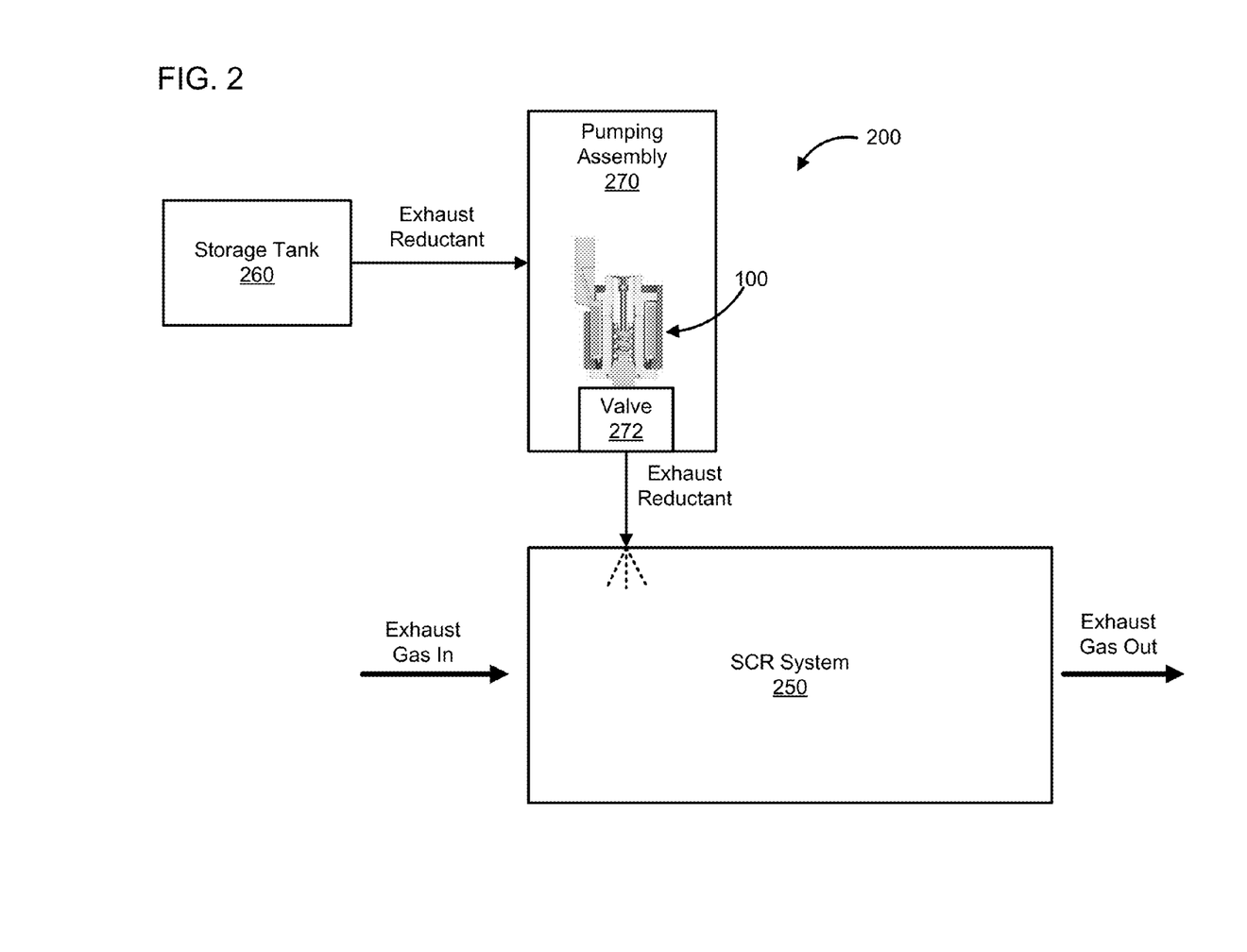
FIG. 2 is a schematic block diagram of another embodiment of a system that includes a pumping assembly which includes the valve of FIG. 1.

FIG. 2 shows a schematic block diagram of an example aftertreatment system 200. The aftertreatment system 200 that includes a storage tank 260, a pumping assembly 270 and an SCR system 250. The aftertreatment system 200 can be used to a treat an exhaust gas (e.g., a diesel exhaust gas) produced by an engine (e.g., a diesel engine) to remove any NOx gases included in the exhaust gas.

The storage tank 260 is configured to store an exhaust reductant. In some embodiments, in which the exhaust gas is a diesel exhaust gas, the exhaust reductant can include a diesel exhaust reductant. Such exhaust reductants can include, for example urea or an aqueous solution of urea (e.g., the exhaust reductant available under the tradename ADBLUE®).

The SCR system 250 is fluidly coupled to the engine and configured to receive an exhaust gas (e.g., a diesel exhaust gas) from the engine. The SCR system 250 is also fluidly coupled to the pumping assembly 270 via a valve 272 included in the pumping assembly 270. The SCR system 250 includes one or more catalysts formulated to reduce the exhaust gas in the presence of the exhaust reductant and remove any NOx gases from the exhaust gas.

The pumping assembly 270 is positioned downstream of the storage tank 260 and upstream of the SCR system 250 and fluidly coupled thereto. The pumping assembly 270 can include a pump (not shown) for pumping the exhaust reductant from the storage tank 260 into the SCR system 250. The pumping assembly 270 also includes the valve solenoid 100 and a valve 272. The valve solenoid 100 is coupled to the valve 272 and configured to actuate the valve 272.

The valve 100 can include, for example, a diaphragm valve or a membrane valve disposed upstream of a fluid communication line fluidly coupling the pumping assembly 270 to the SCR system 250. The armature pin 130 of the valve solenoid 100 can be coupled to the valve 272. In a first operating mode, no current is provided to the coil 104 of the solenoid 100 such that no magnetic field is produced by the coil 104. The biasing member 116 exerts a force on the armature pin 130 such that the armature pin 130 is positioned distal from the pole core 110 and a gap exists between the pole core first portion 111 and the armature second portion 124. The armature pin 130 exerts an axial force on the valve 272 so that the valve 272 is closed and the exhaust reductant is prevented from being communicated to the SCR system 250.

In a second operating mode, an electric current is provided by the coil 104 so that an electromagnetic field is produced by the coil 104. The electromagnetic field pulls the armature 120 in an axial direction towards the pole core 110 against the biasing force. The armature second portion 124 slides axially between the outer tube 106 and the inner tube 108 towards the pole core 110 and contacts the pole core 110. The armature pin 130 axially moves distal to the valve 272 so that the valve 272 is open and the exhaust reductant can be communicated to the SCR system 250.

Figure 3:
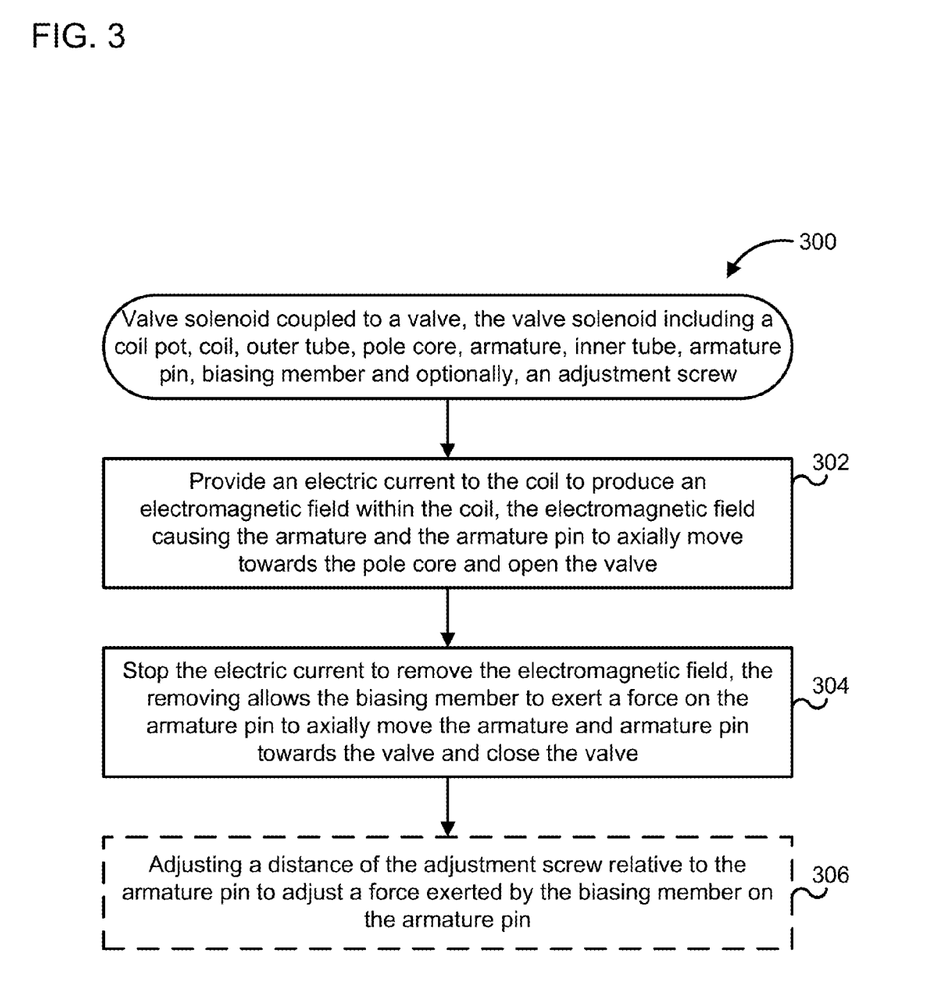
FIG. 3 is a schematic flow diagram of yet another embodiment of a method of operating the valve of FIG. 1.

FIG. 3 is a schematic flow diagram of an exemplary method 300 for operating a valve (e.g., the valve 272) using the valve solenoid 100. The method 300 includes providing an electric current to the coil 104 of the valve 100 at 302. The electric current produces an electromagnetic field within the coil 104 which is conducted through the armature 120 and the pole core 110. The electromagnetic field causes the armature 120 to move in an axial direction towards the pole core 110. The armature second portion 124 slides axially between the outer tube 106 and the inner tube 108 towards the pole core 110 and contacts the pole core 110 so as to axially move the armature pin 130 distal from the valve. The distal movement of the armature pin 130 opens the valve.

The electric current to coil is stopped to remove the electromagnetic field at 304. The removing of the electric field allows the biasing member 116 to exert a biasing force on the armature pin 130. The biasing force causes the armature 120 to axially displace distal from the pole core 110. The armature second portion 124 slides axially between the outer tube 106 and the inner tube 108 away from the pole core 110 so that a gap exists between the pole core first portion 111 and the armature second portion 124. The displacement of the armature causes the armature pin to move axially towards the valve and close the valve.

In one embodiment, in which the valve solenoid 100 also includes the adjustment member 114 positioned within the pole core 110 and coupled to the biasing member 116, the method 300 can also include adjusting a distance of the adjustment member 114 relative to the armature pin 130 at 306. The adjusting of the adjustment member 114 is configured to adjust a force exerted by the biasing member 116 on the armature pin 130 and thereby, the force exerted by the armature pin 130 on the valve.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, features from one particular embodiment may be combined with features from other embodiments as would be understood by one of ordinary skill in the art. Other substitutions, modifications, changes and omissions may also be made in the design, operating conditions and arrangement of the various exemplary embodiments without departing from the scope of the present invention.

What is claimed is:

1. A valve solenoid, comprising:
   a coil pot defining an internal volume;
   a coil positioned concentrically within the internal volume and spaced apart from the coil pot;
   an outer tube positioned concentrically within the coil;
   a pole core including a pole core first portion, a pole core second portion and a pole core third portion, the pole core first portion positioned concentrically within the outer tube and the pole core second portion positioned outside the outer tube;
   an armature including an armature first portion and an armature second portion, the armature first portion positioned distal from the pole core and outside the coil pot, the armature second portion extending from the armature first portion towards the pole core, at least a portion of the armature second portion positioned concentrically within the outer tube, the armature defining a channel therewithin;
   an inner tube, at least a portion of the inner tube positioned concentrically within the channel defined by the armature such that the at least a portion of the armature second portion is positioned concentrically between the outer tube and the inner tube;
   an armature pin fixedly coupled to the armature proximal to the armature first portion, at least a portion of the armature pin positioned within the channel; and
   a biasing member positioned within the channel, a first end of the biasing member coupled to the armature pin, a second end of the biasing member coupled to the pole core, the biasing member configured to exert a biasing force on the armature pin in an axial direction away from the pole core.

2. The valve solenoid of claim 1, further comprising:
   an adjustment member positioned within the pole core, the second end of the biasing member coupled to the adjustment member, at least a portion of the adjustment member positioned within the inner tube.

3. The valve solenoid of claim 2, wherein the adjustment member is coupled to the pole core via threads defined on an inner surface of the pole core, the adjustment member configured to axially displace within the pole core via a rotation of the adjustment member, the rotation configured to adjust a length of the portion of the adjustment member positioned within the inner tube so as to adjust a biasing force exerted by the biasing member on the armature pin.

4. The valve solenoid of claim 3, wherein the biasing member includes a compression spring.

5. The valve solenoid of claim 1, further comprising:
   an adjustment member positioned within the armature, the second end of the biasing member coupled to the adjustment member, at least a portion of the adjustment member positioned within the inner tube.

6. The valve solenoid of claim 1, wherein the valve solenoid is movable between:
   a first operating mode, wherein no electromagnetic field is produced by the coil, and the biasing member exerts an axial force on the armature pin such that the armature is positioned distal from the pole core and a gap exists between the pole core first portion and the armature second portion, and
   a second operating mode, wherein an electromagnetic field is produced by the coil, the electromagnetic field pulls the armature in an axial direction towards the pole core against the biasing force, and the armature second portion axially slides between the outer tube and the inner tube towards the pole core and contacts the pole core first portion.

7. The valve solenoid of claim 6, wherein a combination of the outer tube and the inner tube prevent radial movement of the armature during the axial displacement of the armature relative to the pole core.

8. The valve solenoid of claim 6, wherein an end of the armature pin is coupled to a valve such that in the first operating mode the valve is open, and in the second operating mode the valve is closed.

9. The valve solenoid of claim 1, wherein the pole core third portion abuts an inner surface of the coil pot, the pole core third portion fixedly coupled to the coil pot.

10. The valve solenoid of claim 9, wherein the pole core third portion is fixedly coupled to the inner surface of the coil pot.

11. A system, comprising;
    an exhaust reductant storage tank;
    a pumping assembly, including:
       a valve; and
       a valve solenoid coupled to the valve, the valve solenoid including:
          a coil pot defining an internal volume,
          a coil positioned concentrically within the internal volume and spaced apart from the coil pot,
          an outer tube positioned concentrically within the coil,
          a pole core including a pole core first portion, a pole core second portion and a pole core third portion, the pole core first portion positioned concentrically within the outer tube and the pole core second portion positioned outside the outer tube, an armature including an armature first portion and an armature second portion, the armature first portion positioned distal from the pole core and outside the coil pot, the armature second portion extending from the armature first portion towards the pole core, at least a portion of the armature second portion positioned concentrically within the outer tube, the armature defining a channel therewithin, an inner tube, at least a portion of the inner tube positioned concentrically within the channel defined by the armature such that the at least a portion of the armature second portion is positioned concentrically between the outer tube and the inner tube, an armature pin fixedly coupled to the armature proximal to the armature first portion, at least a portion of the armature pin positioned within the channel, an end of the armature pin distal from the armature coupled to the valve, and a biasing member positioned within the channel, a first end of the biasing member coupled to the armature pin and a second end of the biasing member coupled to the pole core, the biasing member configured to exert a biasing force on the armature pin in an axial direction away from the pole core; and a selective catalytic reduction system in fluidic communication with the pumping assembly via the valve, the selective catalytic reduction system including at least one catalyst formulated to treat an exhaust gas flowing through the SCR system in the presence of the exhaust reductant.

12. The system of claim 11, wherein the valve solenoid further comprises:

an adjustment member positioned within the pole core, the second end of the biasing member coupled to the adjustment member, at least a portion of the adjustment member positioned within the inner tube.

13. The system of claim 12, wherein the adjustment member is coupled to the pole core via threads defined on an inner surface of the pole core, the adjustment member configured to axially displace within the pole core via a rotation of the adjustment member, the rotation configured to adjust a length of the portion of the adjustment member positioned within the inner tube so as to adjust a biasing force exerted by the biasing member on the armature pin.

14. The system of claim 11, wherein the valve solenoid is movable between:

a first operating mode wherein no electromagnetic field is produced by the coil, the biasing member exerts an axial force on the armature pin such that the armature is positioned distal from the pole core and a gap exists between the pole core first portion and the armature second portion, the armature pin exerts an axial force on the valve so that the valve is closed, and a second operating mode wherein an electromagnetic field is produced by the coil, the electromagnetic field pulls the armature in an axial direction towards the pole core against the biasing force, the armature second portion slides axially between the outer tube and the inner tube towards the pole core and contacts the pole core first portion, the armature pin moving distal to the valve so that the valve is open.

15. The system of claim 14, wherein a combination of the outer tube and the inner tube prevent radial movement of the armature during the axial displacement of the armature relative to the pole core.

16. The system of claim 11, wherein the pole core third portion abuts an inner surface of the coil pot, the pole core third portion fixedly coupled to the coil pot.

17. The system of claim 16 wherein the pole core third portion is fixedly coupled to the inner surface of the coil pot.

18. The system of claim 11, wherein the exhaust reductant is a diesel exhaust fluid.

19. The system of claim 18, wherein the exhaust gas is a diesel exhaust gas.

20. A method of operating a valve using the valve solenoid of claim 1, comprising:

passing an electric current through the coil, the electric current producing an electromagnetic field within the coil, the electromagnetic field conducting through the armature and the pole core and causing the armature to move in an axial direction towards the pole core, the armature second portion sliding axially between the outer tube and the inner tube towards the pole core and contacting the pole core first portion so as to axially move the armature pin distal from the valve, the distal movement of the armature pin opening the valve;

stopping the electric current to the coil to remove the electromagnetic field, the removing allowing the biasing member to exert a biasing force on the armature pin, the biasing force causing the armature to axially displace distal from the pole core, the armature second portion sliding axially between the outer tube and the inner tube away from the pole core so that a gap exists between the pole core first portion and the armature second portion, the displacement of the armature causing the armature pin to move axially towards the valve and close the valve.

21. The method of claim 20, wherein the valve solenoid includes an adjustment member positioned within the pole core and coupled to the biasing member, and wherein the method further comprises:

adjusting a distance of the adjustment member relative to the armature pin, the adjusting configured to adjust a force exerted by the biasing member on the armature pin.

* * * * *

UNITED STATES PATENT AND TRADEMARK OFFICE
CERTIFICATE OF CORRECTION

| | | |
|---|---|---|
| PATENT NO. | : 9,790,831 B2 | Page 1 of 1 |
| APPLICATION NO. | : 15/087285 | |
| DATED | : October 17, 2017 | |
| INVENTOR(S) | : Jakob Stang | |

It is certified that error appears in the above-identified patent and that said Letters Patent is hereby corrected as shown below:

On the Title Page

At Column 1, Line 2 item (72) Inventors:
Add -- Christian Schmidt, Obernbreit, Germany. --

Signed and Sealed this
Fifth Day of May, 2020

Andrei Iancu
*Director of the United States Patent and Trademark Office*